US009816440B2

(12) United States Patent
Ito et al.

(10) Patent No.: US 9,816,440 B2
(45) Date of Patent: Nov. 14, 2017

(54) DAMPING DEVICE AND GAS TURBINE COMBUSTOR

(71) Applicant: MITSUBISHI HEAVY INDUSTRIES, LTD., Tokyo (JP)

(72) Inventors: Takanori Ito, Hyogo (JP); Keisuke Matsuyama, Hyogo (JP); Kazufumi Ikeda, Hyogo (JP); Satoshi Tanimura, Hyogo (JP); Shinji Akamatsu, Hyogo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 282 days.

(21) Appl. No.: 14/211,490

(22) Filed: Mar. 14, 2014

(65) Prior Publication Data
US 2014/0196458 A1 Jul. 17, 2014

Related U.S. Application Data

(62) Division of application No. 12/743,832, filed as application No. PCT/JP2008/071050 on Nov. 19, 2008, now Pat. No. 9,291,104.

(30) Foreign Application Priority Data

Nov. 21, 2007 (JP) .................................. 2007-301644
Jun. 4, 2008 (JP) .................................. 2008-146858

(51) Int. Cl.
*F02C 7/24* (2006.01)
*F01D 25/04* (2006.01)
(Continued)

(52) U.S. Cl.
CPC ................ *F02C 7/24* (2013.01); *F01D 25/04* (2013.01); *F23M 20/005* (2015.01); *F23R 3/26* (2013.01);
(Continued)

(58) Field of Classification Search
CPC ............... F01D 25/04; F02C 7/24; F23R 3/26
(Continued)

(56) References Cited

U.S. PATENT DOCUMENTS 7,080,514 B2 * 7/2006 Bland .................. F23M 20/005
181/213
7,320,222 B2 1/2008 Flohr et al.
(Continued)

FOREIGN PATENT DOCUMENTS

JP 11-141326 A 5/1999
JP 2002-220817 A 8/2002
(Continued)

OTHER PUBLICATIONS

U.S. Non-Final Office Action dated Jun. 25, 2015, issued in U.S. Appl. No. 12/743,832 (11 pages).
(Continued)

*Primary Examiner* — Arun Goyal
(74) *Attorney, Agent, or Firm* — Westerman, Hattori, Daniels & Adrian, LLP

(57) ABSTRACT

In a damping device according to the present invention, a damping device 63 is mounted on a bypass pipe 61 that supplies an amount of high-pressure air to a combustor transition piece 33. The damping device 63 includes a fluid introducing unit 71 that forms a fluid introduction space B by covering an outer peripheral portion of the bypass pipe 61, a plurality of acoustic boxes 73a and 73b that forms resonance spaces Da and Db with the base portions connected to the fluid introducing unit 71 and the end portions extending along the outer peripheral portion of the bypass pipe 61 in the circumferential direction, and partition plates 74a and 74b that form resonance ducts Ea and Eb of a predetermined length by partitioning the resonance spaces Da and Db.

4 Claims, 16 Drawing Sheets

(51) Int. Cl.
  *F23R 3/26* (2006.01)
  *G10K 11/172* (2006.01)
  *F23M 20/00* (2014.01)
  *G10K 11/16* (2006.01)

(52) U.S. Cl.
  CPC .......... *G10K 11/161* (2013.01); *G10K 11/172* (2013.01); *F23R 2900/00014* (2013.01)

(58) Field of Classification Search
  USPC .......................................... 60/725, 752–760
  See application file for complete search history.

(56) References Cited

U.S. PATENT DOCUMENTS

| | | | |
|---|---|---|---|
| 7,946,119 | B2 | 5/2011 | Geary |
| 8,490,744 | B2 * | 7/2013 | Nakamura ............. F01D 9/023 181/212 |
| 2005/0144950 | A1 | 7/2005 | Flohr et al. |
| 2005/0223707 | A1 | 10/2005 | Ikeda et al. |

FOREIGN PATENT DOCUMENTS

| | | |
|---|---|---|
| JP | 2004-183943 A | 7/2004 |
| JP | 2004-183944 A | 7/2004 |
| JP | 2005-527763 A | 9/2005 |
| JP | 2005-315473 A | 11/2005 |
| JP | 2006-022966 A | 1/2006 |
| JP | 2006-266671 A | 10/2006 |

OTHER PUBLICATIONS

Notice of Allowance dated Nov. 17, 2015, issued in U.S. Appl. No. 12/743,832 11 pages.
International Search Report of PCT/JP2008/071050, dated Jan. 13, 2009.
Notice of Allowance dated Aug. 31, 2012, issued in Korean Patent Application No. 10-2010-7010980, with Partial English Translation (3 pages).
Chinese Office Action dated Jun. 5, 2013, issued in corresponding Chinese Patent Application No. 200880117244.0, w/ English translation.
Extended European Search Report dated Feb. 18, 2015, issued in corresponding European Patent Application No. 08851831.1 (6 pages).
Office Action dated Sep. 17, 2014, issued in U.S. Appl. No. 12/743,832 (8 pages).
Office Action dated May 15, 2014, issued in U.S. Appl. No. 12/743,832.
U.S. Office Action dated Jan. 13, 2015, issued in U.S. Appl. No. 12/743,832 (10 pages).
Communication under Rule 71(3) EPC dated Sep. 2, 2016, issued in counterpart European Patent Application No. 08 851 831.1. (7 pages).

* cited by examiner

DAMPING DEVICE AND GAS TURBINE COMBUSTOR

CROSS-REFERENCE TO RELATED APPLICATION

This Application is a Divisional of copending U.S. application Ser. No. 12/743,832 filed May 20, 2010, and wherein application Ser. No. 12/743,832 is a national stage application filed under 35 U.S.C. §371 of International Application No. PCT/JP2008/071050, filed on Nov. 19, 2008, which is based upon and claims priority under 35 U.S.C. §119(a) to Japan Patent Application No. 2007-301644 filed Nov. 21, 2007 and Japan Patent Application No. 2008-146858 filed Jun. 4, 2008.

TECHNICAL FIELD

The present invention relates to a damping device that can suppress combustion vibrations generated in a combustor, for example, in a gas turbine that obtains rotational power by supplying fuel to compressed high-temperature and high-pressure air for combustion, and supplying generated combustion gas to a turbine, and relates to a gas turbine combustor including the damping device.

BACKGROUND ART

For example, a gas turbine includes a compressor, a combustor, and a turbine. Air taken in from an air inlet port is compressed by the compressor to compressed air with high-temperature and high-pressure. Fuel is supplied to the compressed air for combustion in the combustor, and the high-temperature and high-pressure combustion gas drives the turbine and a generator connected to the turbine. In this case, the turbine has a chamber in which a plurality of stator vanes and rotor blades are alternately arranged, and an output shaft to which the generator is connected is rotated and driven by driving the rotor blades with the combustion gas. The combustion gas having driven the turbine is converted into static pressure by a diffuser in an exhaust casing, and released to atmosphere.

In the combustor of the gas turbine formed in this manner, an inner tube is contained in and supported by an outer casing, and a casing is formed by connecting a combustor transition piece to an end portion of the inner tube. An air passage that supplies high-pressure air to the inner tube is formed between the outer casing and the inner tube. A pilot nozzle is arranged at the center of the inner tube, a plurality of main fuel nozzles is arranged at an inner peripheral surface of the inner tube, and a pilot burner is arranged at the periphery of the pilot nozzle.

A bypass pipe is connected to the combustor transition piece, and the bypass pipe forms a bypass passage for supplying high-pressure air to the combustor transition piece. A high-pressure flow rate adjustment valve is installed in the bypass pipe.

Accordingly, an air flow of the high-temperature and high-pressure compressed air compressed by the compressor flows into the air passage of the gas turbine combustor, and is introduced into the inner tube. In the inner tube, the compressed air and fuel injected from a fuel nozzle are mixed, and flow into the combustor transition piece as a swirl flow of an air-fuel premixture. At this time, the air-fuel mixture is ignited by the pilot burner, combusted, and generates combustion gas. At this time, a part of the combustion gas is blown into the combustor transition piece so as to be diffused to surrounding areas with a flame. Accordingly, the air-fuel premixture injected from the main fuel nozzles is ignited and combusted. The compressed air from the compressor is divided into combustion air guided to the inner tube through the air passage and bypass air guided to the combustor transition piece through the bypass pipe, by opening and closing the flow rate adjustment valve. Accordingly, the air-fuel ratio in the inner tube can be adjusted. The air-fuel ratio is reduced by opening the flow rate adjustment valve, and the air-fuel ratio is increased by closing the flow rate adjustment valve.

In the gas turbine combustor operated as described above, combustion vibrations may occur during the combustion of air-fuel mixture. The combustion vibrations cause noise and vibration during the operation of the gas turbine. In particular, in recent gas turbines, environmental effects are taken into consideration during operation, and reduction of nitrogen oxide (NOx) from flue gas has been carried out. To reduce NOx, fuel-lean combustion is often used. However, in the lean combustion, combustion tends to become unstable, thereby easily generating combustion vibrations. Accordingly, the conventional gas turbine combustors include a damping device to damp vibrations.

For example, Patent document 1 discloses a gas turbine combustor that includes the damping device. In the gas turbine combustor disclosed in Patent document 1, an acoustic damper is attached to a bypass elbow. The acoustic damper includes a holder mounted so as to hold the bypass elbow, a pair of acoustic boxes fixed at an interval from the bypass elbow, and a pair of cassettes arranged between the bypass elbow and the pair of acoustic boxes and fixed with the holder. The cassettes include a porous metal. Accordingly, low frequency vibrations resonate in the acoustic boxes including a resonance pipe in a maze shape, and the porous metals fixed to more than two locations can damp vibrations over a wider range of frequencies.

[Patent document 1] Japanese Patent Application Laid-open No. 2006-022966

DISCLOSURE OF INVENTION

Problem to be Solved by the Invention

In the conventional gas turbine combustors, the acoustic box is a spiral duct partitioned by partitions. Accordingly, to form the acoustic box, a number of plate members need to be curved and connected by welding, thereby complicating manufacturing and increasing manufacturing costs.

The present invention has been made to solve the problems, and an object of the present invention is to provide a damping device and a gas turbine combustor that can effectively damp vibrations, simplify the structure, and reduce costs.

Means for Solving Problem

A damping device of the present invention used to solve the problems has configurations of the following 1 to 10.

1) According to an aspect of the present invention, a damping device that is mounted on an outer peripheral portion of a pipe including a flow passage through which fluid flows and that damps acoustic vibrations by introducing therein the fluid in the pipe, includes: a fluid introducing unit in which a fluid introduction space that is able to introduce therein the fluid in the flow passage is formed by covering at least a part of the outer peripheral portion of the pipe; a plurality of acoustic boxes that includes a resonance space communicably connected with the fluid introduction space, a base portion connected to the fluid introducing unit, and an end portion extending along the outer peripheral portion of the pipe; and a partition plate that forms a resonance duct of a predetermined length by partitioning each resonance space.

2) Advantageously, in the damping device, the fluid introducing unit is connected to the acoustic boxes through a branch pipe, and the fluid introduction space is communicably connected with the resonance spaces through a communication passage whose diameter is reduced in the branch pipe.

3) Advantageously, in the damping device, the fluid introducing unit communicably connects the fluid introduction space and the resonance spaces.

4) Advantageously, in the damping device, the fluid introduction space is communicably connected with the flow passage through a plurality of through holes formed in the pipe, and communicably connected with the resonance spaces so that the resonance spaces are branched from the fluid introduction space.

5) Advantageously, in the damping device, the resonance duct having a predetermined length is formed in a zigzag manner with the resonance spaces partitioned by alternately fixing a plurality of such partition plates to wall surfaces opposite to each other in the acoustic boxes.

6) Advantageously, in the damping device, a plurality of such resonance ducts is set at different lengths.

7) Advantageously, in the damping device, the resonance ducts having a predetermined length are formed by fixing the partition plate in the acoustic boxes, and two resonance ducts having different lengths are formed by communicably connecting an end portion of the resonance ducts with the fluid introduction space by connecting the end portion of the acoustic boxes to the fluid introducing unit through a connection pipe, and by fixing a closing plate at a middle portion of the resonance ducts in a longitudinal direction.

8) Advantageously, in the damping device, the resonance duct is a plurality of independent resonance ducts divided with a partition wall that divides the pipe in an axial direction of the pipe, and includes an opening for communicably connecting the resonance ducts or a closing plate that closes the opening.

9) Advantageously, in the damping device, the resonance duct includes a resistance member that provides resistance to fluid.

10) According to another aspect of the present invention, a gas turbine combustor includes: a combustion cylinder in which high-pressure air and fuel are combusted to generate combustion gas; a transition piece that is connected to the combustion cylinder and that guides the combustion gas to a turbine; a high-pressure combustion air supply passage that supplies high-pressure air to be used for combustion to the combustion cylinder; a fuel nozzle that injects fuel into high-temperature air in the combustion cylinder; and a bypass pipe that supplies high-pressure air to the transition piece. The bypass pipe includes the damping device according to any one of 1) to 9).

Effect of the Invention

A damping device according to the present invention includes a fluid introducing unit in which a fluid introduction space that can introduce therein fluid in a flow passage is formed, by covering at least a part of an outer peripheral portion of a pipe, a plurality of acoustic boxes that includes a resonance space communicably connected with the fluid introduction space with the base portions connected to the fluid introducing unit and the end portions extending along the outer peripheral portion of the pipe, and a partition plate that forms a resonance duct of a predetermined length by partitioning each resonance space. Accordingly, acoustic vibrations are generated in the flow passage of the pipe. However, when acoustic energy caused by the acoustic vibrations is transmitted to the resonance duct through the fluid introduction space, the acoustic vibrations are suppressed by resonance in the resonance duct. Consequently, it is possible to damp the acoustic vibrations effectively. A resonance duct of a predetermined length can be easily formed by partitioning the resonance spaces of the acoustic boxes with the partition plate. As a result, it is possible to simplify the structure and reduce costs.

Figure 1:
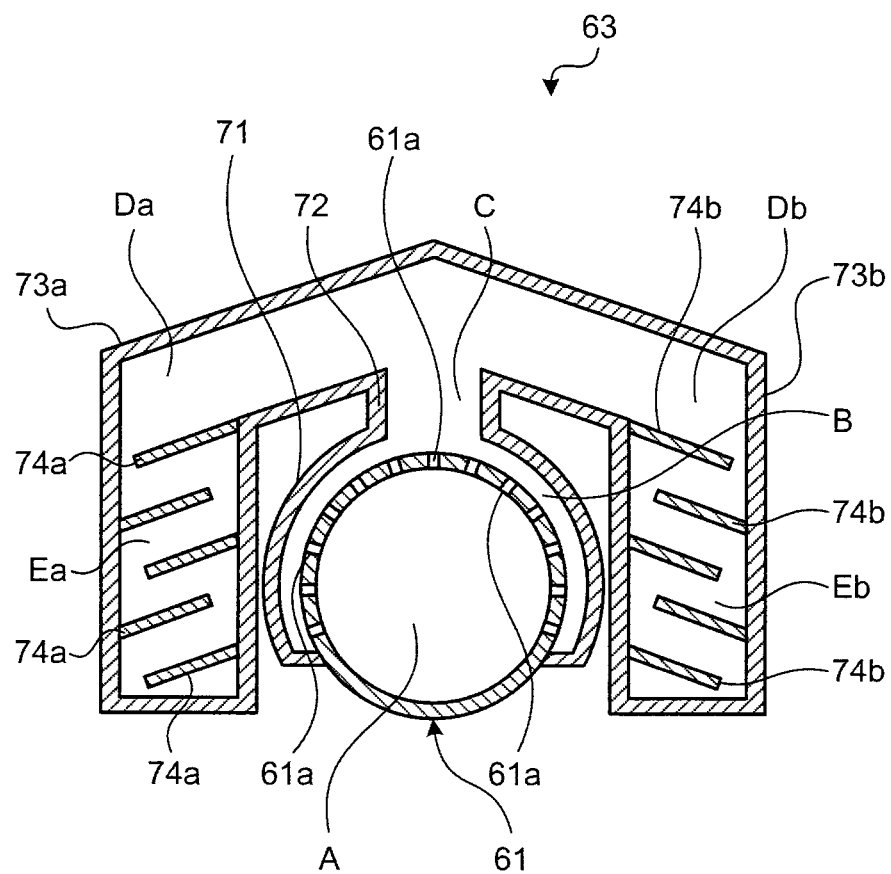
FIG. 1 is a sectional view (sectional view taken along the line I-I in FIG. 4) of a damping device applied to a gas turbine combustor according to a first embodiment of the present invention.

EXPLANATIONS OF LETTERS OR NUMERALS 11 compressor
12 combustor
13 turbine
14 exhaust chamber
31 outer casing (combustion cylinder)
32 inner tube (combustion cylinder)
33 combustor transition piece
34 pilot nozzle (fuel nozzle)
35 main fuel nozzle (fuel nozzle)
44 air passage
61 bypass pipe (pipe)
63, 81, 91, 101, 111, 121A, 121B, 131 damping device
71 fluid introducing unit
72 branch pipe
73a, 73b, 73c, 73d acoustic box
74a, 74b partition plate
A flow passage
B fluid introduction space
C communication passage
Da, Db resonance space
Ea, Eb, Ec resonance duct
82 closing plate
83 connection pipe
92, 93 resistance member

BEST MODE(S) FOR CARRYING OUT THE INVENTION

Exemplary embodiments of a damping device and a gas turbine combustor according to the present invention will be described in detail with reference to the accompanying drawings. However, the present invention is not limited to the embodiments.

First Embodiment

Figure 2:
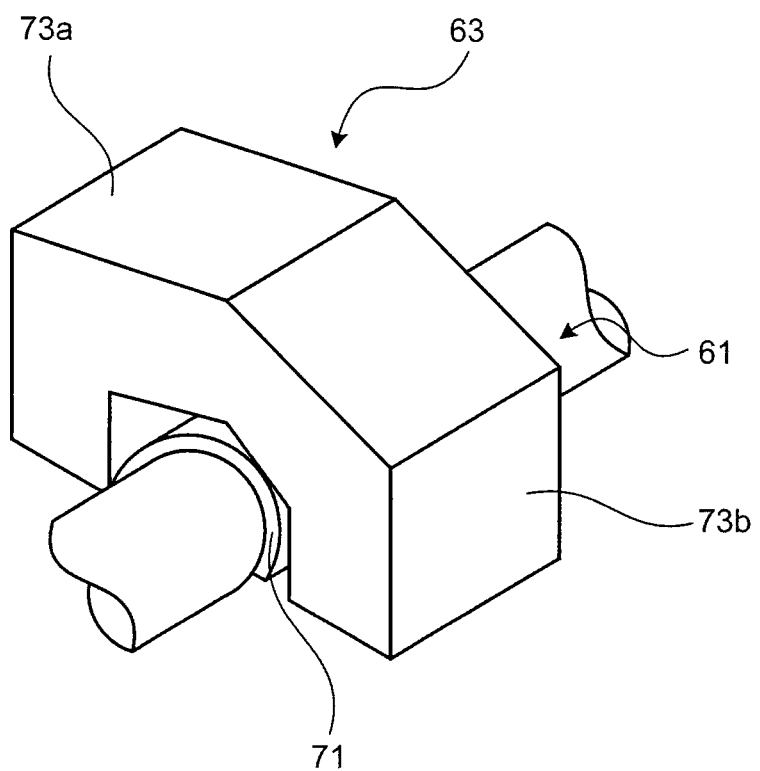
FIG. 2 is a schematic of the damping device of the first embodiment.
Figure 3:
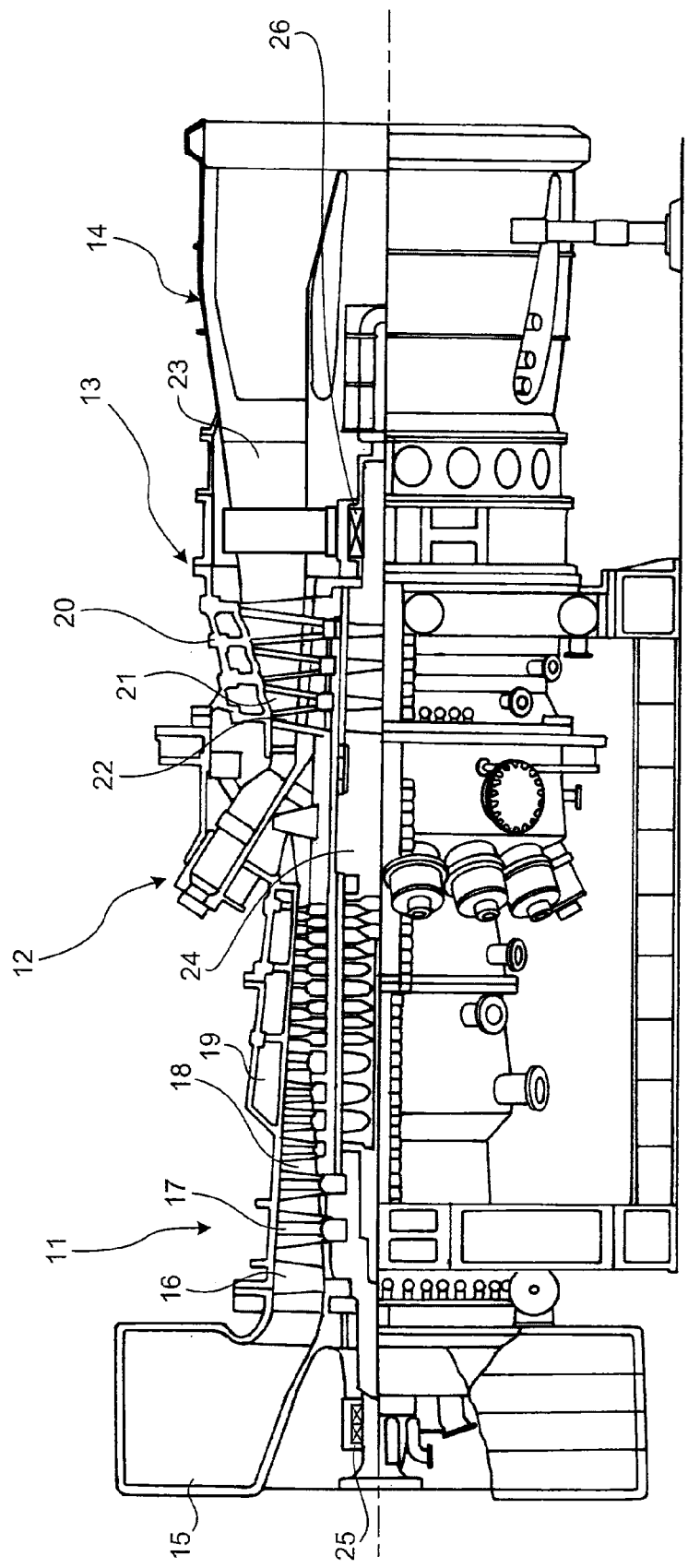
FIG. 3 is a schematic of a gas turbine of the first embodiment.
Figure 4:
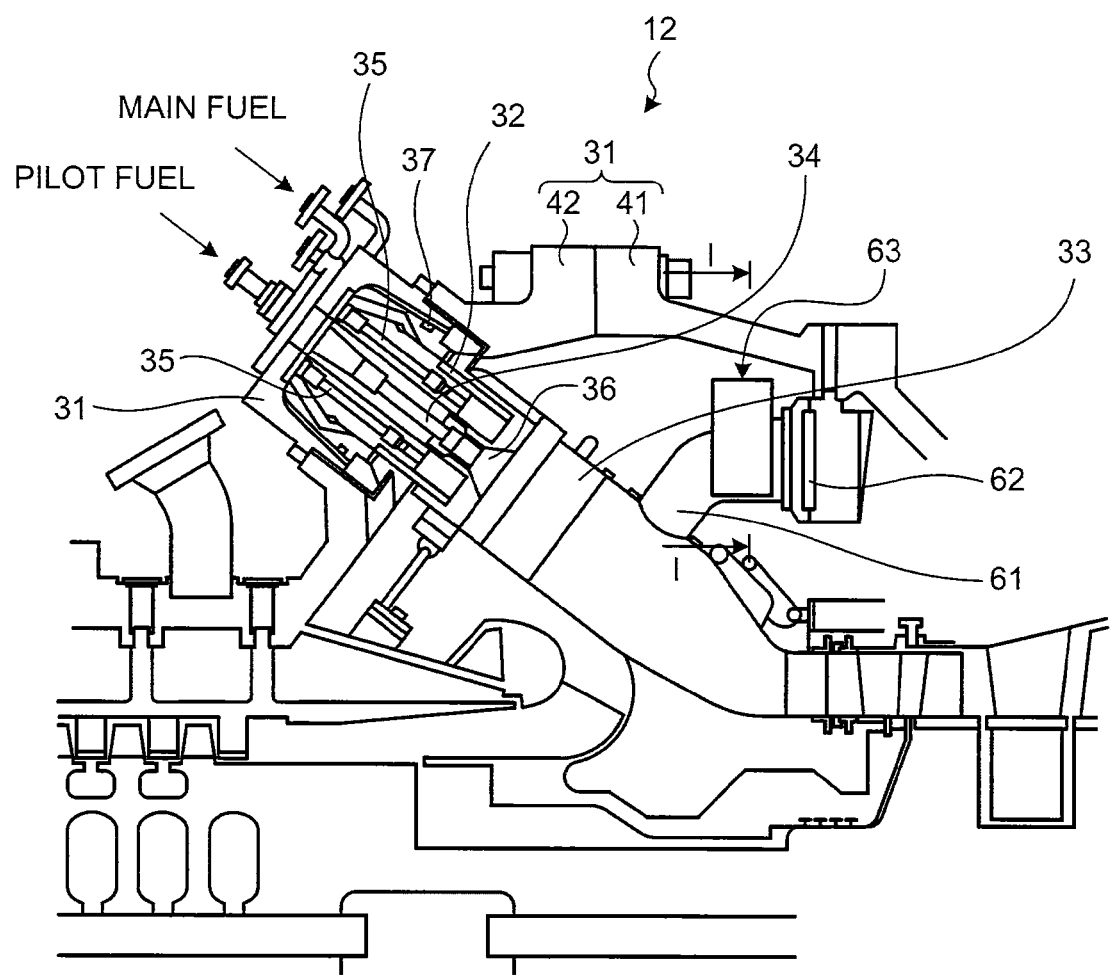
FIG. 4 is a schematic of the gas turbine combustor of the first embodiment.
Figure 5:
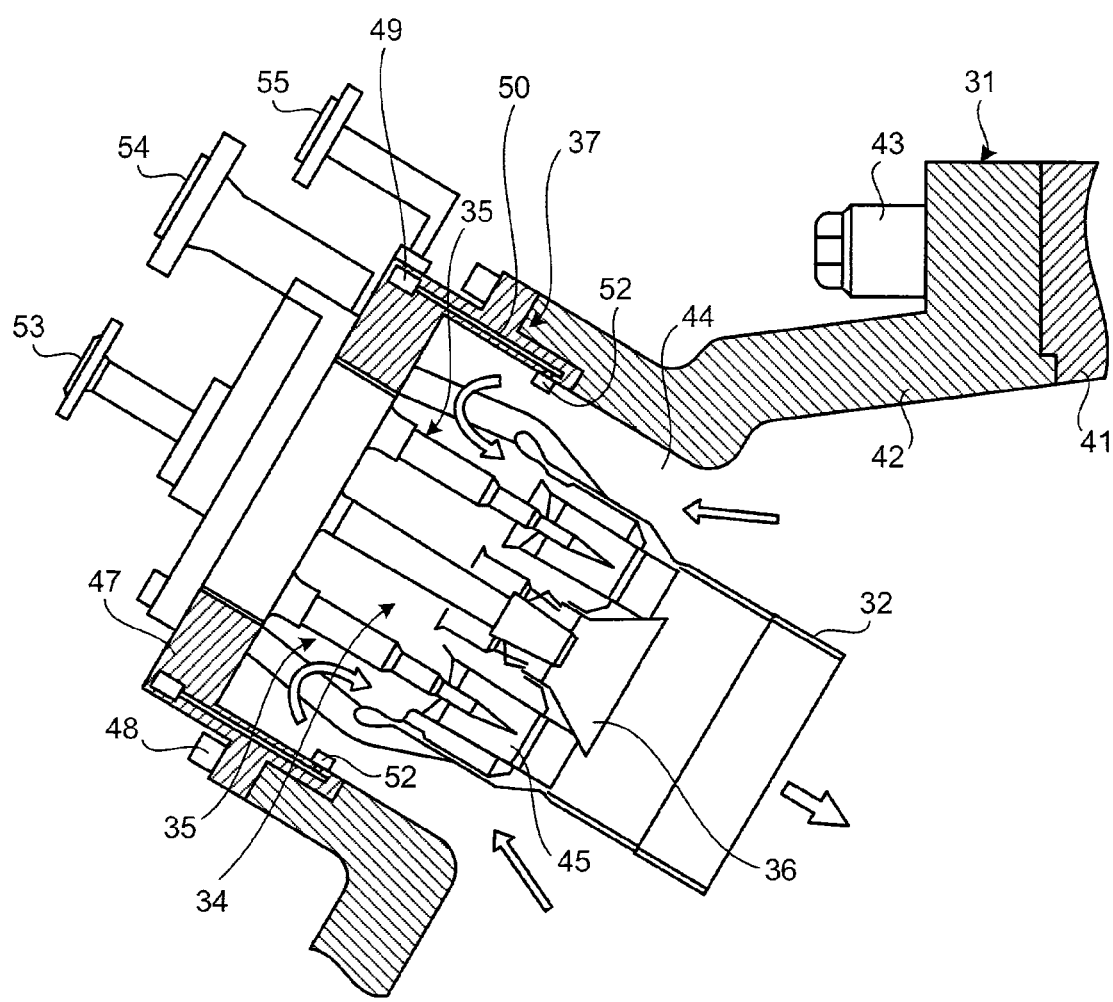
FIG. 5 is a sectional view of an essential portion of the gas turbine combustor of the first embodiment.

FIG. 1 is a sectional view (sectional view taken along the line I-I in FIG. 4) of a damping device applied to a gas turbine combustor according to a first embodiment of the present invention. FIG. 2 is a schematic of the damping device of the first embodiment. FIG. 3 is a schematic of a gas turbine of the first embodiment. FIG. 4 is a schematic of the gas turbine combustor of the first embodiment. FIG. 5 is a sectional view of an essential portion of the gas turbine combustor of the first embodiment.

A gas turbine of the first embodiment, as shown in FIG. 3, includes a compressor 11, a combustor (gas turbine combustor) 12, a turbine 13, and an exhaust chamber 14. A generator, which is not shown, is connected to the turbine 13. The compressor 11 includes an air inlet port 15 for taking in air, and a plurality of stator vanes 17 and rotor blades 18 are alternately arranged in a compressor chamber 16. A bleed air manifold 19 is located at the outside. The combustor 12 supplies fuel to compressed air compressed by the compressor 11, and the compressed air is combusted by being ignited by a burner. The turbine 13 includes a turbine chamber 20 in which a plurality of stator vanes 21 and rotor blades 22 are alternately arranged. The exhaust chamber 14 includes an exhaust diffuser 23 connected to the turbine 13. A rotor (turbine shaft) 24 is placed so as to penetrate through the center portions of the compressor 11, the combustor 12, the turbine 13, and the exhaust chamber 14. The end at the side of the compressor 11 is rotatably supported by a bearing 25, and the end at the side of the exhaust chamber 14 is rotatably supported by a bearing 26. A plurality of disk plates is fixed to the rotor 24, and the rotor blades 18 and 22 are also connected to the rotor 24. A driving shaft of the generator, which is not shown, is connected to the end at the side of the exhaust chamber 14.

Accordingly, air taken in from the air inlet port 15 of the compressor 11 passes though the stator vanes 21 and the rotor blades 22, is compressed, and becomes high-temperature and high-pressure compressed air. The compressed air to which a predetermined fuel is supplied is combusted in the combustor 12. The high-temperature and high-pressure combustion gas that is working fluid generated in the combustor 12 passes through the stator vanes 21 and the rotor blades 22 in the turbine 13, and drives and rotates the rotor 24. The combustion gas also drives the generator connected to the rotor 24, and the flue gas is converted into static pressure by the exhaust diffuser 23 in the exhaust chamber 14, and released to atmosphere.

In the combustor 12, as shown in FIG. 4, an inner tube 32 is contained in and supported by an outer casing 31 at a predetermined interval, and a combustor casing is formed by connecting a combustor transition piece 33 to the end portion of the inner tube 32. In this case, a combustion cylinder of the present invention is the outer casing 31 and the inner tube 32. A pilot nozzle 34 is arranged at the center of the inner tube 32, and a plurality of main fuel nozzles (premixing nozzles) 35 is arranged so as to surround the pilot nozzle 34 on the inner peripheral surface of the inner tube 32 in the circumferential direction. A pilot cone 36 is attached to the end portion of the pilot nozzle 34. A plurality of top hat nozzles 37 is arranged on the inner peripheral surface of the outer casing 31 in the circumferential direction. In this case, a fuel nozzle of the present invention is the pilot nozzle 34 and the main fuel nozzles (premixing nozzles) 35.

Describing in more detail, as shown in FIG. 5, in the outer casing 31, an outer casing cover 42 is closely brought into contact with a base portion of an outer casing main body 41, and is fastened with a plurality of fastening bolts 43. A base portion of the inner tube 32 is attached to the outer casing cover 42, and an air passage (high-pressure combustion air supply passage) 44 is formed between the outer casing cover 42 and the inner tube 32. The pilot nozzle 34 is arranged at the center of the inner tube 32, the main fuel nozzles 35 are arranged so as to surround the pilot nozzle 34, and each of the end portions of the main fuel nozzles 35 is communicably connected with a main burner 45.

A top hat unit 47 is attached to the outer casing cover 42, and fastened with a plurality of fastening bolts 48. The top hat unit 47 includes the top hat nozzles 37.

In other words, a fuel cavity 49 is formed on a base portion of the top hat unit 47 in the circumferential direction, and a plurality of fuel passages 50 is formed from the fuel cavity 49 towards the tip end. A peg 52 is connected to an end portion of each of the fuel passages 50.

A pilot fuel line is connected to a fuel port 53 of the pilot nozzle 34, a main fuel line is connected to a fuel port 54 of the main fuel nozzles 35, and a top hat fuel line is connected to a fuel port 55 of the top hat nozzles 37. The pilot fuel line, the main fuel line, and the top hat fuel line are not shown.

As shown in FIG. 4, a bypass pipe 61 is connected to the transition piece 33, and the bypass pipe 61 has a bypass valve (flow rate adjustment valve) 62. In this case, a pipe of the present invention is the bypass pipe 61, and a flow passage A through which high-pressure air (fluid) flows is formed in the bypass pipe 61. A damping device 63 that damps acoustic vibrations is mounted on the bypass pipe 61.

In the damping device 63, as shown in FIGS. 1 and 2, a fluid introducing unit 71 that covers at least a part of the outer peripheral portion of the bypass pipe 61 is arranged in the circumferential direction, and fluid introduction space B is formed between the bypass pipe 61 and the fluid introducing unit 71. A plurality of through holes 61*a* is formed on the bypass pipe 61 covered with the fluid introducing unit 71, and the fluid introduction space B is communicably connected with the flow passage A of the bypass pipe 61 through the through holes 61*a*.

The fluid introducing unit 71 is formed in a ring-shape so as to cover a part of the outer peripheral portion of the bypass pipe 61, and is fixed to the bypass pipe 61 by welding and the like. A plurality of acoustic boxes 73*a* and 73*b* (two in the present embodiment) is connected to the fluid introducing unit 71 through a branch pipe 72. Base portions of the acoustic boxes 73*a* and 73*b* are connected to the fluid introducing unit 71 through the branch pipe 72, and end portions thereof are extended along the outer peripheral portions of the bypass pipe 61 and the fluid introducing unit 71 in the circumferential direction. Resonance spaces Da and Db are formed inside the acoustic boxes 73*a* and 73*b* by closing the end portions thereof. The resonance spaces Da and Db are communicably connected with the fluid introduction space B of the fluid introducing unit 71 through a communication passage C whose diameter is reduced in the branch pipe 72.

Each of the acoustic boxes 73*a* and 73*b* is branched from the branch pipe 72, bent in an L-shape, and formed in a hollow box shape. By fixing a plurality of partition plates 74*a* and 74*b* in the end portions of the acoustic boxes 73*a* and 73*b*, the resonance spaces Da and Db are partitioned, whereby resonance ducts Ea and Eb having a predetermined length are formed. In other words, in the end portions of the acoustic boxes 73*a* and 73*b*, only the ends of the partition plates 74*a* and 74*b* are alternately fixed to the wall surfaces opposite to each other. Accordingly, the resonance spaces Da and Db are partitioned, and the resonance ducts Ea and Eb having a predetermined length are formed in a zigzag manner. In this case, the lengths of the resonance ducts Ea and Eb formed in a zigzag manner are obtained by obliquely fixing the ends of the partition plates 74*a* and 74*b* to the wall surfaces opposite to each other in the acoustic boxes 73*a* and 73*b*.

In the present embodiment, a housing of the damping device is integrally formed with the fluid introducing unit 71, the branch pipe 72, and the acoustic boxes 73*a* and 73*b*. The damping device 63 is produced by fixing the partition plates 74*a* and 74*b* in the inside of the housing (acoustic boxes 73*a* and 73*b*). In this case, the fluid introducing unit 71, the branch pipe 72, and the acoustic boxes 73*a* and 73*b* may be made of sheet metal, and the members may be joined by welding. The damping device 63 is fixed to the bypass pipe 61 by welding.

Accordingly, the flow passage A of the bypass pipe 61 is communicably connected with the fluid introduction space B of the fluid introducing unit 71 through the through holes 61*a*, and the fluid introduction space B is communicably connected with the resonance spaces Da and Db of the acoustic boxes 73*a* and 73*b* through the communication passage C of the branch pipe 72. The resonance spaces Da and Db are communicably connected with the resonance ducts Ea and Eb formed at the end portions of the resonance spaces Da and Db.

In the gas turbine combustor 12 of the first embodiment formed in this manner, as shown in FIGS. 4 and 5, when an air flow of the high-temperature and high-pressure compressed air compressed by the compressor 11 flows into a chamber of the combustor 12, the compressed air passes through the air passage 44 and is mixed with fuel injected from the top hat nozzles 37, and the air-fuel mixture flows into the inner tube 32. In the inner tube 32, the air-fuel mixture is mixed with fuel injected from the main fuel nozzles 35 by the main burner 45, and flows into the combustor transition piece 33 as a swirl flow of air-fuel premixture. The air-fuel mixture is also mixed with fuel injected from the pilot nozzle 34, ignited by a pilot light, which is not shown, of the main burner 45, combusted, and blown into the transition piece 33 as combustion gas. At this time, a part of the combustion gas is blown into the transition piece 33 so as to be diffused to surrounding areas with a flame. Accordingly, the air-fuel premixture flown into the transition piece 33 from the main fuel nozzles 35 is ignited and combusted. In other words, a diffusion flame generated from pilot fuel injected from the pilot nozzle 34 can stabilize flame to combust a lean air-fuel premixture supplied from the main fuel nozzles 35 in a stable manner.

By adjusting the opening of the bypass valve 62 in the bypass pipe 61 connected to the combustor transition piece 33, the compressed air in the chamber is supplied to the transition piece 33 through the flow passage A of the bypass pipe 61. In other words, by opening and closing the bypass valve 62, the compressed air is divided into combustion air guided to the inner tube 32 through the air passage 44 and bypass air guided to the combustor transition piece 33 through the bypass pipe 61. Accordingly, air-fuel ratio in the inner tube 32 can be adjusted.

In the gas turbine combustor 12 operated in this manner, combustion vibrations may occur when the compressed air-fuel mixture is combusted in the inner tube 32. In the present embodiment, the damping device 63 is mounted on the bypass pipe 61. Accordingly, the combustion vibrations generated in the inner tube 32 are damped by the damping device 63 through the bypass pipe 61.

In other words, when the high-pressure air and the fuel are combusted in the inner tube 32 and generate combustion gas, the combustion vibrations are transmitted to the bypass pipe 61 with the combustion gas, and acoustic energy caused by the combustion vibrations is transmitted to the damping device 63. Accordingly, as shown in FIG. 1, the acoustic energy caused by the combustion vibrations transmitted to the fluid introduction space B of the fluid introducing unit 71 from the flow passage A of the bypass pipe 61 through the through holes 61*a* is transmitted to the resonance spaces Da and Db of the acoustic boxes 73*a* and 73*b* from the fluid introduction space B through the communication passage C of the branch pipe 72. The acoustic energy is then transmitted to the resonance ducts Ea and Eb from the resonance spaces Da and Db. Consequently, the combustion vibrations (acoustic energy) are damped by producing resonance in the resonance ducts Ea and Eb. In this case, the lengths of the resonance ducts Ea and Eb are set in advance corresponding to the frequency characteristics of the combustion vibrations generated in the inner tube 32.

In this manner, in the damping device 63 and the gas turbine combustor 12 of the first embodiment, the inner tube 32 is arranged inside the outer casing 31, the combustor transition piece 33 is connected to the end portion of the inner tube 32, and the pilot nozzle 34 and the main fuel nozzles 35 are arranged inside of the inner tube 32. The air passage 44 for supplying high-pressure air used for combustion to the inner tube 32 is arranged, and the bypass pipe 61 for supplying an amount of high-pressure air to the combustor transition piece 33 is also arranged. The damping device 63 is mounted on the bypass pipe 61, and the damping device 63 includes the fluid introducing unit 71 that forms the fluid introduction space B by covering the outer peripheral portion of the bypass pipe 61. The damping device 63 also includes the acoustic boxes 73a and 73b that form the resonance spaces Da and Db with the base portions connected to the fluid introducing unit 71 and the end portions extending along the outer peripheral portion of the bypass pipe 61 in the circumferential direction, and includes the partition plates 74a and 74b that form the resonance ducts Ea and Eb at a predetermined length obtained by partitioning the resonance spaces Da and Db.

Accordingly, when the high-pressure air and the fuel are combusted in the inner tube 32 and generate combustion gas, the combustion vibrations generated correspondingly are transmitted to the bypass pipe 61, and acoustic energy caused by the combustion vibrations is transmitted to the fluid introduction space B from the flow passage A. The acoustic energy is then transmitted to the resonance spaces Da and Db from the fluid introduction space B through the communication passage C, and resonates in the resonance ducts Ea and Eb obtained by partitioning the resonance spaces Da and Db with the partition plates 74a and 74b. Accordingly, it is possible to properly damp the combustion vibrations.

In this case, the damping device 63 is produced by integrally forming the fluid introducing unit 71, the branch pipe 72, and the acoustic boxes 73a and 73b, and by fixing the partition plates 74a and 74b in the inside of the acoustic boxes 73a and 73. Accordingly, the damping device 63 can be easily produced by joining the fluid introducing unit 71, the branch pipe 72, the acoustic boxes 73a and 73b, and the partition plates 74a and 74b together by welding. Consequently, it is possible to simplify the structure and reduce costs.

In the damping device 63 of the first embodiment, the acoustic boxes 73a and 73b are connected to the fluid introducing unit 71 through the branch pipe 72. The fluid introduction space B is communicably connected with the resonance spaces Da and Db through the communication passage C whose diameter is reduced in the branch pipe 72. Accordingly, acoustic energy caused by acoustic vibrations generated in the flow passage A of the bypass pipe 61 is transmitted to the resonance spaces Da and Db through one communication passage C and is damped. Accordingly, the acoustic vibrations can be effectively damped by using the resonance spaces Da and Db, and the resonance ducts Ea and Eb can be efficiently obtained in a limited space.

In the damping device 63 of the first embodiment, the fluid introduction space B is communicably connected with the flow passage A through the through holes 61a formed on the bypass pipe 61, and the resonance spaces Da and Db are communicably connected so as to be branched from the fluid introduction space B. Accordingly, acoustic energy caused by the acoustic vibrations generated in the flow passage A of the bypass pipe 61 is transmitted to the fluid introduction space B through the through holes 61a. The acoustic energy is then transmitted to the resonance spaces Da and Db through the communication passage C and is damped. Consequently, it is possible to effectively damp the acoustic vibrations by using the resonance spaces Da and Db, and the resonance ducts Ea and Eb can be efficiently obtained in a limited space.

In the damping device 63 of the first embodiment, the partition plates 74a and 74b are alternately fixed to the wall surfaces opposite to each other in the acoustic boxes 73a and 73b to partition the resonance spaces, and the resonance ducts Ea and Eb having a predetermined length are formed in a zigzag manner. Consequently, the acoustic vibrations can be effectively damped, because the resonance ducts Ea and Eb having a predetermined length are formed in the resonance spaces Da and Db having a limited space by using the partition plates 74a and 74b.

Second Embodiment

Figure 6:
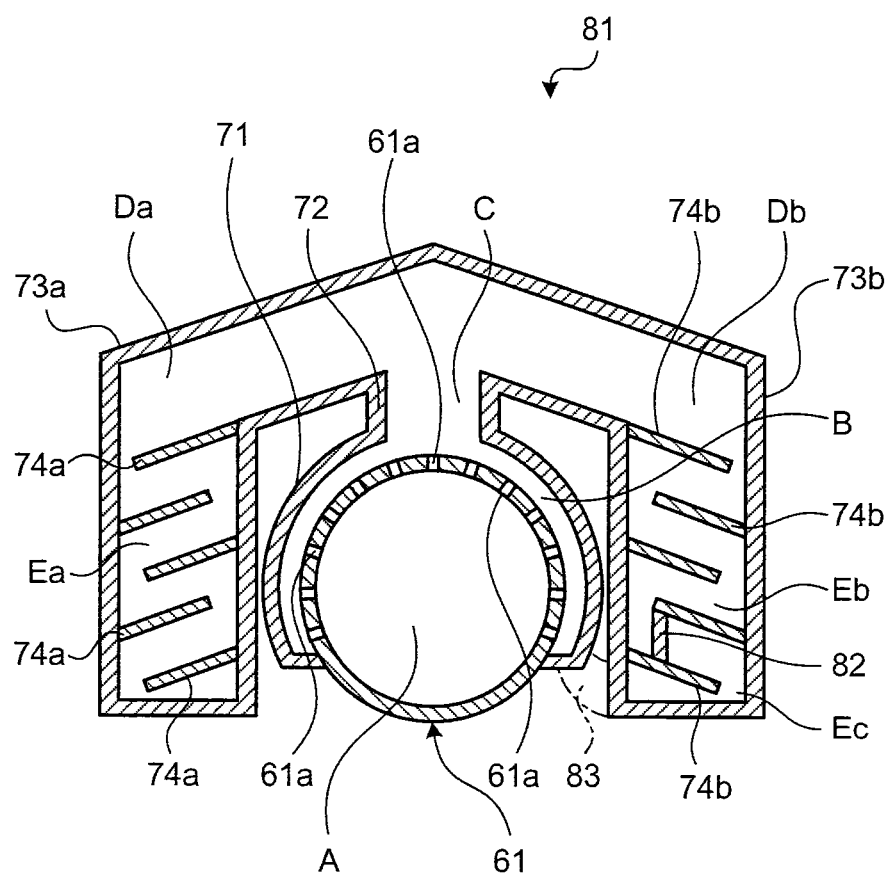
FIG. 6 is a sectional view of a damping device applied to a gas turbine combustor according to a second embodiment of the present invention.

FIG. 6 is a sectional view of a damping device applied to a gas turbine combustor according to a second embodiment of the present invention. The members having the same functions as those in the embodiment described above are denoted by the same reference numerals, and the descriptions thereof will be omitted.

In the second embodiment, as shown in FIG. 6, a damping device 81 that damps acoustic vibrations is mounted on the bypass pipe 61. The damping device 81 includes a plurality of resonance ducts set at different lengths.

In other words, in the damping device 81, the fluid introduction space B is formed by fixing the fluid introducing unit 71 to the outer peripheral portion of the bypass pipe 61. The fluid introduction space B is communicably connected with the flow passage A of the bypass pipe 61 through the through holes 61a. Two acoustic boxes 73a and 73b are connected to the fluid introducing unit 71 through the branch pipe 72, and the base portions of the acoustic boxes 73a and 73b are connected to the fluid introducing unit 71 through the branch pipe 72, and the end portions thereof are extended along the outer peripheral portions of the bypass pipe 61 and the fluid introducing unit 71 in the circumferential direction. The base portions of the acoustic boxes 73a and 73b are communicably connected with the fluid introduction space B through the communication passage C of the branch pipe 72, and the end portions thereof are closed, whereby the resonance spaces Da and Db are formed. The resonance ducts Ea and Eb in a predetermined length are formed in the resonance spaces Da and Db, by fixing the partition plates 74a and 74b to the end portions of the resonance spaces Da and Db.

In the present embodiment, a closing plate 82 is fixed between the two partition plates 74b by welding in the resonance space Db of the second acoustic box 73b. Accordingly, the flow passage A of the bypass pipe 61 is communicably connected with the fluid introduction space B of the fluid introducing unit 71 through the through holes 61a, communicably connected with the resonance space Da of the first acoustic box 73a through the communication passage C of the branch pipe 72, and communicably connected with the resonance duct Ea. The flow passage A is also communicably connected with the resonance space Db of the second acoustic box 73b through the communication passage C of the branch pipe 72, and communicably connected with the resonance duct Eb. In this case, the closing plate 82 is fixed to the partition plates 74b of the second acoustic box 73b. Accordingly, the length from the flow passage A to the end portion of the resonance duct Ea through the fluid introduction space B, the communication passage C, and the resonance space Da, and the length from the flow passage A to the closed end (closing plate 82) of the resonance duct Eb through the fluid introduction space B, the communication passage C, and the resonance space Db are different.

In the damping device 81 formed in this manner, combustion vibrations are transmitted to the bypass pipe 61 with combustion gas, and acoustic energy caused by the combustion vibrations is transmitted to the damping device 81. The acoustic energy caused by the combustion vibrations transmitted to the fluid introduction space B of the fluid introducing unit 71 from the flow passage A of the bypass pipe 61 through the through holes 61*a* is transmitted to the resonance spaces Da and Db of the acoustic boxes 73*a* and 73*b* from the fluid introduction space B through the communication passage C of the branch pipe 72, and then transmitted to the resonance ducts Ea and Eb from the resonance spaces Da and Db. Accordingly, the combustion vibrations (acoustic energy) are damped by producing resonance in the resonance ducts Ea and Eb. In this case, because the lengths of the resonance ducts Ea and Eb are set differently, vibrations of different frequencies caused by combustion are properly damped.

In the damping device 81 of the present embodiment, because the closing plate 82 is fixed between the two partition plates 74*b* in the acoustic box 73*b*, the length of the second resonance duct Eb is different from that of the first resonance duct Ea. In this case, the resonance space Db of the acoustic box 73*b* is divided into two resonance ducts Eb and Ec by the closing plate 82. Accordingly, three resonance ducts Ea, Eb, and Ec having different lengths can be formed by connecting the fluid introducing unit 71 and the end portion of the acoustic box 73*b* with a connection pipe 83 and by communicably connecting the fluid introduction space B and the resonance duct Ec. Consequently, the vibrations of three types of frequencies caused by combustion are properly damped.

In this manner, in the damping device 81 of the second embodiment, the fluid introduction space B is formed by covering the outer peripheral portion of the bypass pipe 61 with the fluid introducing unit 71, the base portions of the acoustic boxes 73*a* and 73*b* including the resonance spaces Da and Db are connected to the fluid introducing unit 71, the end portions thereof are extended along the outer peripheral portion of the bypass pipe 61 in the circumferential direction, the resonance ducts Ea and Eb are formed by partitioning the resonance spaces Da and Db with the partition plates 74*a* and 74*b*, and the length of the second resonance duct Eb is made shorter than that of the first resonance duct Ea by fixing the closing plate 82 between the two partition plates 74*b* in the second acoustic box 73*b*.

Accordingly, vibrations caused by combustion are transmitted to the bypass pipe 61, and acoustic energy caused by the combustion vibrations is transmitted to the fluid introduction space B from the flow passage A. The acoustic energy is then transmitted to the resonance spaces Da and Db from the fluid introduction space B through the communication passage C, and resonates in the resonance ducts Ea and Eb formed by partitioning the resonance spaces Da and Db with the partition plates 74*a* and 74*b*. Consequently, it is possible to properly damp the combustion vibrations. At this time, by making the lengths of the resonance ducts Ea and Eb different from each other, the generated acoustic vibrations of different frequencies can be properly damped by the resonance ducts Ea and Eb.

The three resonance ducts Ea, Eb, and Ec having different lengths can be formed by connecting the fluid introducing unit 71 and the end portion of the acoustic box 73*b* with the connection pipe 83, and by communicably connecting the fluid introduction space B and the resonance duct Ec. Accordingly, vibrations of three types of frequencies caused by combustion can be properly damped, and the resonance ducts Ea, Eb, and Ec having different lengths can be efficiently formed in a limited space.

Third Embodiment

Figure 7:
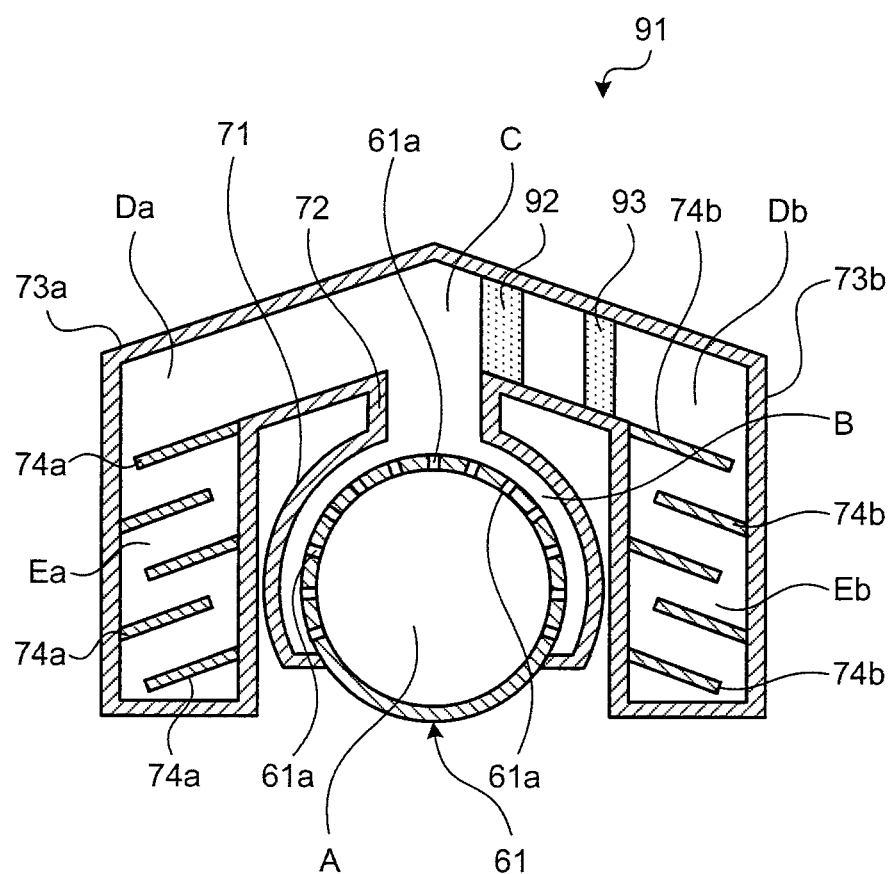
FIG. 7 is a sectional view of a damping device applied to a gas turbine combustor according to a third embodiment of the present invention.

FIG. 7 is a sectional view of a damping device applied to a gas turbine combustor according to a third embodiment of the present invention. The members having the same functions as those in the embodiments described above are denoted by the same reference numerals, and the descriptions thereof will be omitted.

In the third embodiment, as shown in FIG. 7, a damping device 91 that damps acoustic vibrations is mounted on the bypass pipe 61. In the damping device 91, the resonance duct includes a resistance member that provides resistance to fluid.

In other words, in the damping device 91, the fluid introduction space B is formed by fixing the fluid introducing unit 71 to the outer peripheral portion of the bypass pipe 61, and the fluid introduction space B is communicably connected with the flow passage A of the bypass pipe 61 through the through holes 61*a*. Two acoustic boxes 73*a* and 73*b* are connected to the fluid introducing unit 71 through the branch pipe 72, and the base portions of the acoustic boxes 73*a* and 73*b* are connected to the fluid introducing unit 71 through the branch pipe 72, and the end portions thereof are extended along the outer peripheral portions of the bypass pipe 61 and the fluid introducing unit 71 in the circumferential direction. The base portions of the acoustic boxes 73*a* and 73*b* are communicably connected with the fluid introduction space B through the communication passage C of the branch pipe 72, and the end portions thereof are closed, whereby the resonance spaces Da and Db are formed. The resonance ducts Ea and Eb of a predetermined length are formed by fixing the partition plates 74*a* and 74*b* to the end portions of the resonance spaces Da and Db.

In the present embodiment, two resistance members 92 and 93 are provided in the resonance space Db of the second acoustic box 73*b* at the upstream of the resonance duct Eb. In this case, the resistance members 92 and 93 are made of a porous metal, a porous plate, and the like. In the embodiment, two resistance members 92 and 93 are provided in one resonance space Db. However, the installation position and the number of the resistance member are not limited by the embodiment, and may be set appropriately depending on the structure of the combustor and the combustion mode.

In the damping device 91 formed in this manner, combustion vibrations are transmitted to the bypass pipe 61 with combustion gas, and acoustic energy caused by the combustion vibrations is transmitted to the damping device 91. Accordingly, the acoustic energy caused by the combustion vibrations transmitted to the fluid introduction space B of the fluid introducing unit 71 from the flow passage A of the bypass pipe 61 through the through holes 61*a* is transmitted to the resonance spaces Da and Db of the acoustic boxes 73*a* and 73*b* from the fluid introduction space B through the communication passage C of the branch pipe 72, and transmitted to the resonance ducts Ea and Eb from the resonance spaces Da and Db. At this time, the vibration energy is reduced by passing through the resistance members 92 and 93. The combustion vibrations (acoustic energy) are then damped by producing resonance in the resonance ducts Ea and Eb.

In this manner, in the damping device 91 of the third embodiment, the fluid introduction space B is formed by covering the outer peripheral portion of the bypass pipe 61 with the fluid introducing unit 71, the base portions of the acoustic boxes 73a and 73b including the resonance spaces Da and Db are connected to the fluid introducing unit 71, the end portions thereof are extended along the outer peripheral portion of the bypass pipe 61 in the circumferential direction, the resonance ducts Ea and Eb are formed by partitioning the resonance spaces Da and Db with the partition plates 74a and 74b, and the resistance members 92 and 93 are arranged in the resonance space Db of the second acoustic box 73b.

Accordingly, vibrations caused by combustion are transmitted to the bypass pipe 61, and acoustic energy caused by the combustion vibrations is transmitted to the fluid introduction space B from the flow passage A. The acoustic energy is then transmitted to the resonance spaces Da and Db from the fluid introduction space B through the communication passage C, and resonates in the resonance ducts Ea and Eb formed by partitioning the resonance spaces Da and Db with the partition plates 74a and 74b. Consequently, it is possible to properly damp the combustion vibrations. When the combustion vibrations (acoustic energy) pass through the resistance members 92 and 93, the vibration energy is reduced. Consequently, it is possible to effectively damp acoustic vibrations.

Fourth Embodiment

Figure 8:
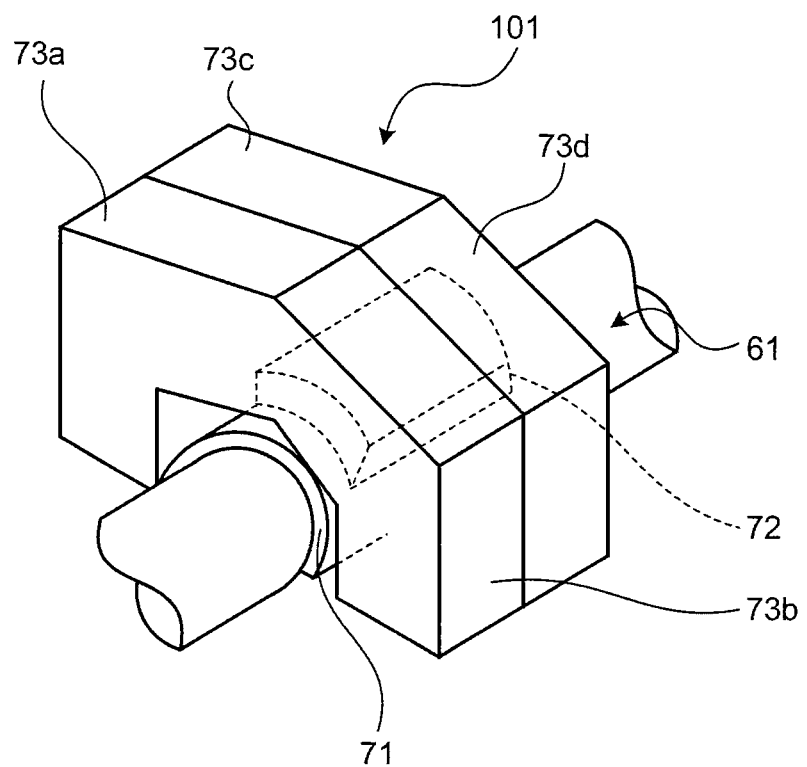
FIG. 8 is a schematic of a damping device applied to a gas turbine combustor according to a fourth embodiment of the present invention.

FIG. 8 is a schematic of a damping device applied to a gas turbine combustor according to a fourth embodiment of the present invention. The members having the same functions as those in the embodiments described above are denoted by the same reference numerals, and the descriptions thereof will be omitted.

In the fourth embodiment, as shown in FIG. 8, a damping device 101 that damps acoustic vibrations is mounted on the bypass pipe 61, and the damping device 101 includes four resonance ducts.

In other words, in the damping device 101, a fluid introduction space is formed by fixing the fluid introducing unit 71 to the outer peripheral portion of the bypass pipe 61, and four acoustic boxes 73a, 73b, 73c, and 73d are connected to the fluid introducing unit 71 through the branch pipe 72. In each of the resonance spaces in the acoustic boxes 73a, 73b, 73c, and 73d, a resonance duct having a predetermined length is formed with a plurality of partition plates, which is not shown.

In the damping device 101 formed in this manner, combustion vibrations are transmitted to the bypass pipe 61 with combustion gas, and acoustic energy caused by the combustion vibrations is transmitted to the damping device 101. Accordingly, the acoustic energy caused by the combustion vibrations transmitted to the fluid introduction space of the fluid introducing unit 71 from the flow passage of the bypass pipe 61 is transmitted to the resonance spaces of the acoustic boxes 73a, 73b, 73c, and 73d from the fluid introduction space through the communication passage of the branch pipe 72, and transmitted to the resonance ducts from the resonance spaces. Consequently, the combustion vibrations (acoustic energy) are damped by producing resonance in the resonance ducts.

In this manner, in the damping device 101 of the fourth embodiment, the fluid introduction space is formed by covering the outer peripheral portion of the bypass pipe 61 with the fluid introducing unit 71, the base portions of the acoustic boxes 73a, 73b, 73c, and 73d including the resonance spaces are connected to the fluid introducing unit 71, the end portions thereof are extended along the outer peripheral portion of the bypass pipe 61 in the circumferential direction, and the resonance ducts are formed by partitioning the resonance spaces with the partition plates.

Accordingly, vibrations caused by combustion are transmitted to the bypass pipe 61, acoustic energy caused by the combustion vibrations is transmitted to the fluid introduction space from the flow passage, and transmitted to the four resonance spaces from the fluid introduction space through the communication passage. Consequently, the acoustic energy resonates in the resonance duct of the resonance spaces, whereby the combustion vibrations are properly damped. At this time, the combustion vibrations of four frequencies can be effectively damped by making the lengths of the four resonance ducts different from each other.

In the embodiments described above, two or four acoustic boxes are provided and the same number of resonance spaces and resonance ducts are formed. However, the numbers are not limited by the embodiments, and may be set appropriately depending on the structure of the combustor and the combustion mode.

In the embodiments described above, the damping device is mounted on the bypass pipe. However, it is not limited thereto, and the damping device may be mounted on the inner tube or on the combustor transition piece.

Fifth Embodiment

Figure 9:
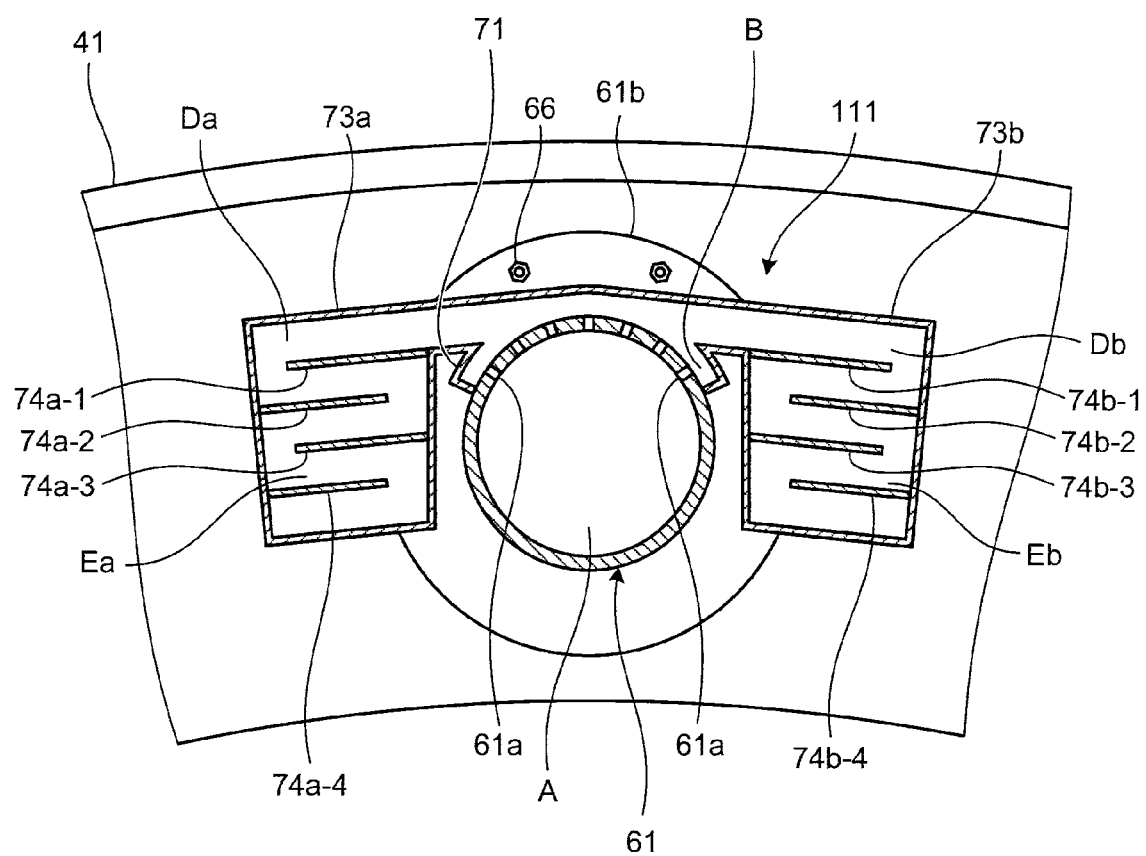
FIG. 9 is a sectional view of a damping device applied to a gas turbine combustor according to a fifth embodiment of the present invention.

FIG. 9 is a schematic of a damping device applied to a gas turbine combustor according to a fifth embodiment of the present invention. The members having the same functions as those in the embodiments described above are denoted by the same reference numerals, and the descriptions thereof will be omitted.

In the fifth embodiment, as shown in FIG. 9, a damping device 111 that damps acoustic vibrations is mounted on the bypass pipe 61. In the damping device 111, the fluid introduction space B and the resonance spaces Da and Db are directly communicably connected, without providing the branch pipe 72 that forms the communication passage C as shown in FIG. 1.

In the present embodiment, four partition plates 74a-1 to 74a-4 and 74b-1 to 74b-4 are used as partition members for forming the resonance ducts Ea and Eb.

The size of the fluid introducing unit 71 is also reduced by covering about a quarter of the bypass pipe 61, unlike the damping device 63 shown in FIG. 1 that covers about three quarters of the bypass pipe 61.

Figure 10A:
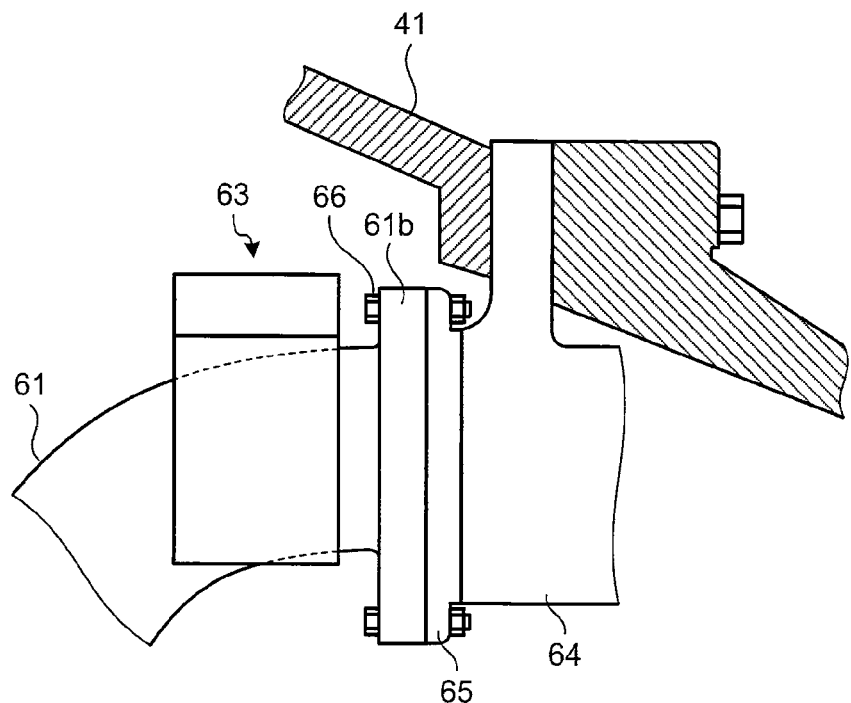
FIG. 10A is a side schematic of the damping device according to the first embodiment of the present invention being installed.
Figure 10B:
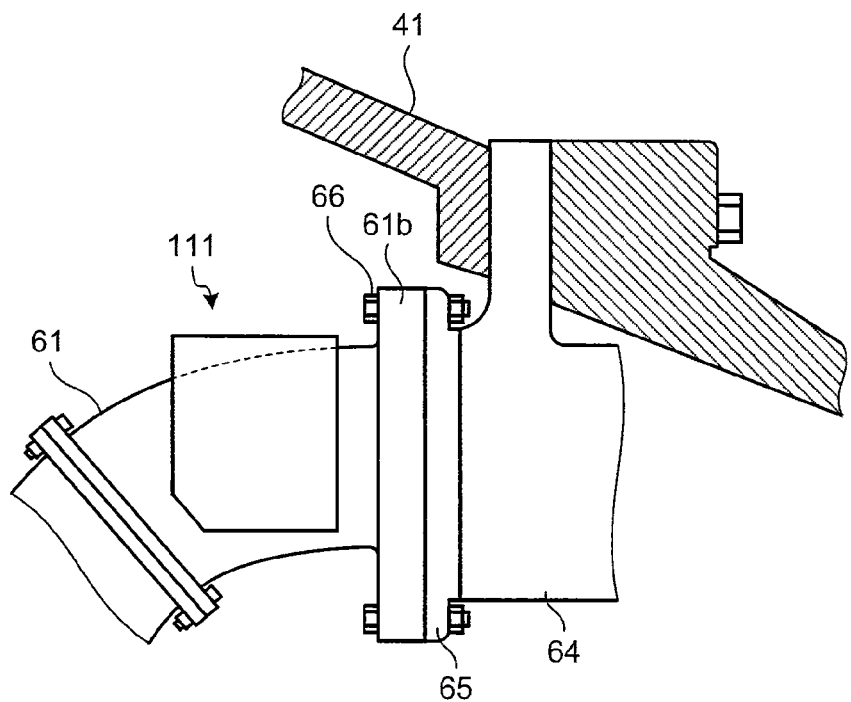
FIG. 10B is a side schematic of the damping device according to the fifth embodiment of the present invention being installed.

Accordingly, unlike the damping device 63 of the first embodiment, as shown in FIG. 10A, in which the resonance space portion is largely projected from the bypass pipe 61 in the upper direction, in the damping device 111 of the fifth embodiment, as shown in FIG. 10B, the projected amount of the resonance space portion from the bypass pipe 61 is minimum. Consequently, it is possible to reduce the size.

In this manner, in the present embodiment, the size of the damping device 111 can be reduced, and the damping device 111 can be removed without opening the chamber.

As shown in FIG. 10B, the sectional area of the damping device 111 can be increased by forming a part of the main body of the damping device 111 into a tapered shape. Accordingly, it is possible to damp low frequencies.

In this manner, in the present embodiment, it is possible to damp low frequencies, without sacrificing the effect of reducing combustion vibrations.

Sixth Embodiment

Figure 12:
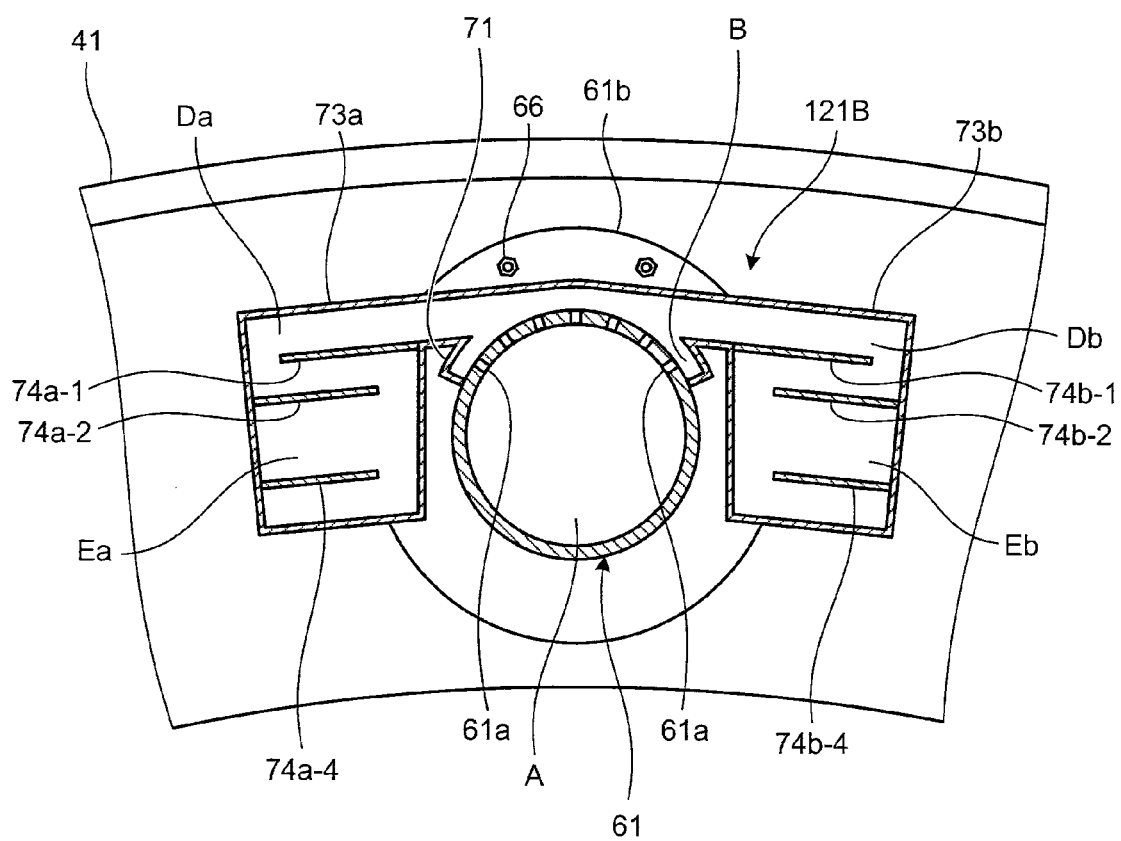
FIG. 12 is a sectional view of another damping device applied to the gas turbine combustor according to the sixth embodiment of the present invention.

FIGS. 12-1 and 12-2 are schematics of a damping device applied to a gas turbine combustor according to a sixth embodiment of the present invention. The members having the same functions as those in the embodiments described above are denoted by the same reference numerals, and the descriptions thereof will be omitted.

In the sixth embodiment, low frequencies are damped by eliminating a part of the partition plates 74a-1 to 74a-4 and 74b-1 to 74b-4 from the damping device 111 shown in FIG. 9.

Figure 11:
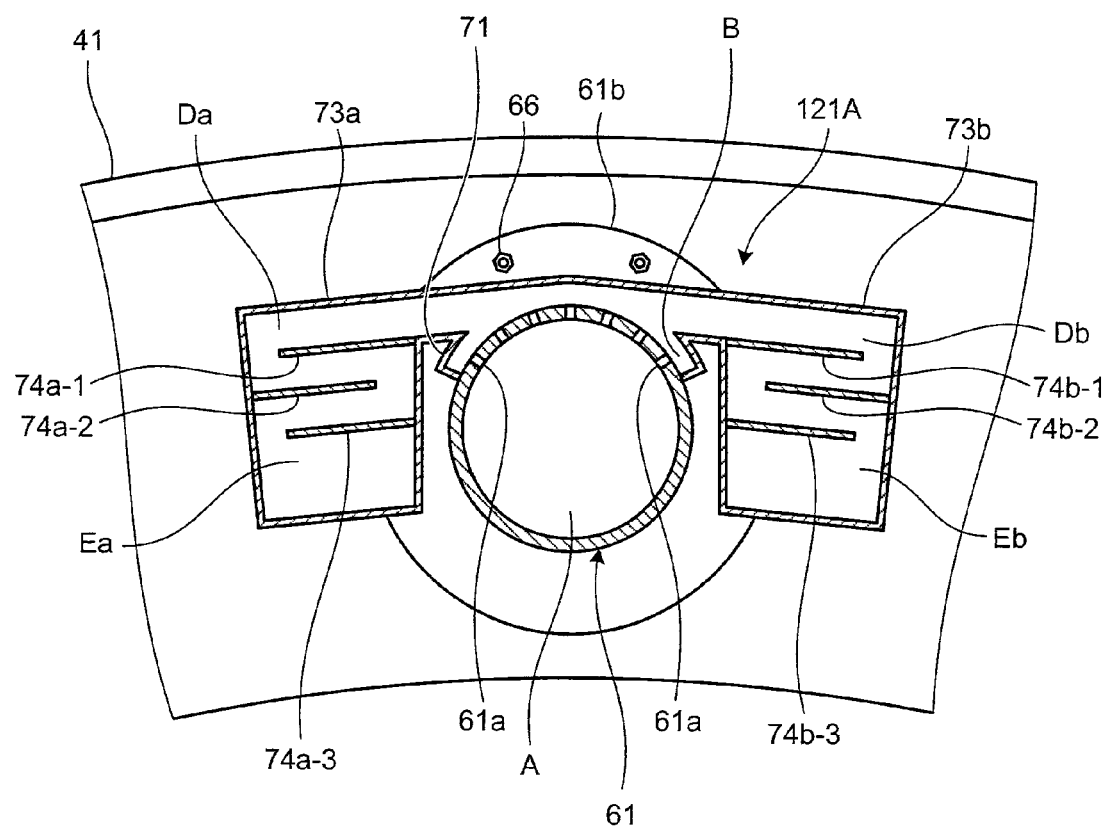
FIG. 11 is a sectional view of a damping device applied to a gas turbine combustor according to a sixth embodiment of the present invention.

In other words, in a damping device 121A in FIG. 11, low frequencies are damped by eliminating the partition plates 74a-4 and 74b-4 from the damping device 111 in FIG. 9 to be used as a Helmholtz resonator.

In a damping device 121B in FIG. 12, low frequency tuning is carried out by eliminating the partition plates 74a-3 and 74b-3 from the damping device 111 in FIG. 9, and enlarging the sectional areas in the middle of the resonance ducts Ea and Eb.

Figure 13A:
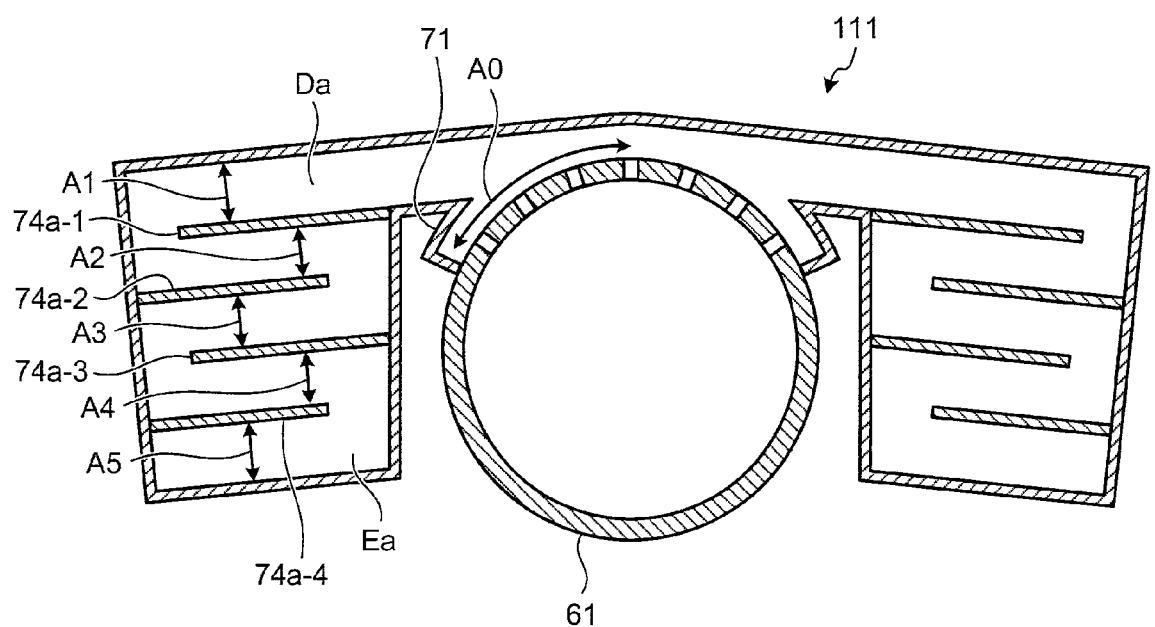
FIG. 13A is a schematic of test points on a damping ratio and frequency of the damping device according to the sixth embodiment of the present invention.
Figure 13B:
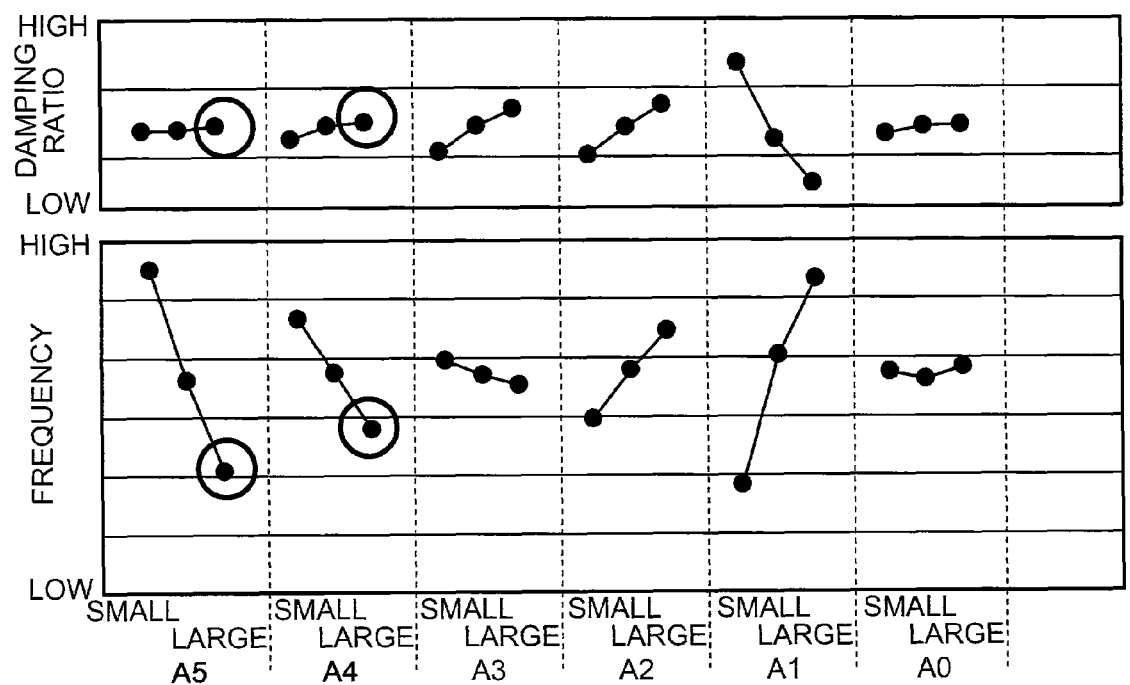
FIG. 13B is a schematic of test results of the damping ratio and frequency of the damping device according to the sixth embodiment of the present invention.

This is because relationships of the damping ratios and the frequencies as shown in FIG. 13B can be seen in the portions of the damping device 111 shown in FIG. 13A.

In the test, the standard sectional area of each of the portions is set to "1", and the relationship between the damping ratio and the frequency is measured, when the area is made smaller than the standard sectional area and when the area is made larger than the standard sectional area.

Accordingly, in A5 (corresponding to the damping device 121A in FIG. 11) and in A4 (corresponding to the damping device 121B in FIG. 12), the damping ratio remains the same, but the frequency is lowered with the increase of the sectional area.

Consequently, it is possible to damp low frequencies by increasing the spaces of the middle portions and the bottom portions of the resonance ducts Ea and Eb.

As a result, it is possible to damp low frequency vibrations effectively.

Seventh Embodiment

Figure 14A:
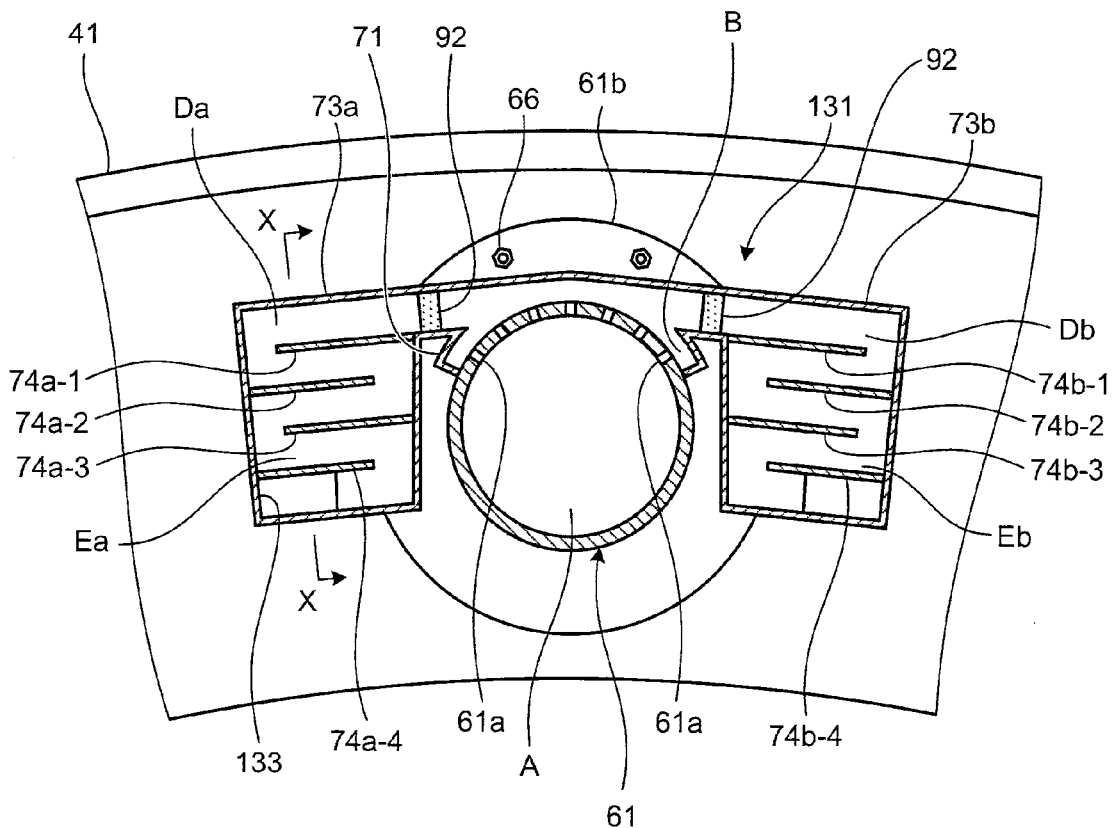
FIG. 14A is a sectional view of another damping device applied to a gas turbine combustor according to a seventh embodiment of the present invention.
Figure 14B:
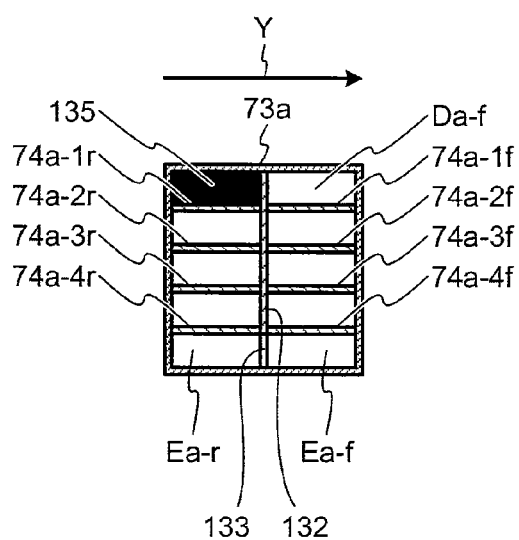
FIG. 14B is a sectional view taken along the line X-X of another damping device applied to the gas turbine combustor according to the seventh embodiment of the present invention.

FIGS. 14A and 14B are sectional views of a damping device applied to a gas turbine combustor according to a seventh embodiment of the present invention. FIG. 14B is a sectional view taken along the line X-X in FIG. 14A. The members having the same functions as those in the embodiments described above are denoted by the same reference numerals, and the descriptions thereof will be omitted.

In the seventh embodiment, as shown in FIGS. 14A and 14B, a damping device 131 that damps acoustic vibrations is mounted on the bypass pipe 61. The damping device 131 forms a plurality of independent resonance duct chambers (in the present embodiment, front resonance duct Ea-f and rear resonance duct Ea-r) divided with a partition wall 132 in the axial direction Y of the bypass pipe 61. The damping device 131 also includes an opening 133 that communicably connects the front resonance duct Ea-f and the rear resonance duct Ea-r, or a closing plate 134 that closes the opening 133. The lengths of the resonance ducts can be adjusted by closing or opening the closing plate 134 depending on the frequencies.

Figure 14C:
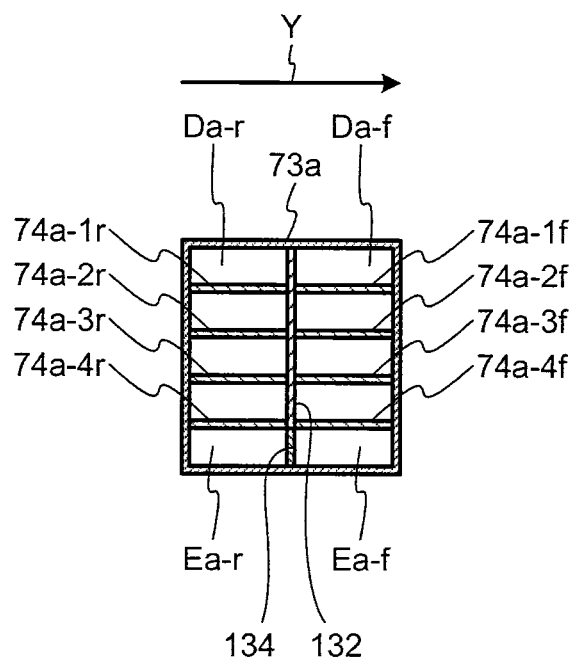
FIG. 14C is a sectional view taken along the line X-X of another damping device applied to the gas turbine combustor according to the seventh embodiment of the present invention.

FIGS. 14B and 14C include front partition plates 74a-1f to 74a-4f, rear partition plates 74b-1f to 74b-4f, and the resistance member 92.

In the present embodiment, the left resonance duct of the damping device 121 in FIG. 14A is described. However, the same applies for the right resonance duct.

In other words, in the damping device 131, as shown in FIG. 14B, when the resonance ducts (front resonance duct Ea-f and rear resonance duct Ea-r) divided in the Y direction (in the present embodiment, the rear side of the outer casing main body 41) into front and rear are formed and the opening 133 is opened, the front resonance duct Ea-f and the rear resonance duct Ea-r in which the sectional areas are a half and the lengths are twice as long as those of the damping device 111 of the sixth embodiment can be formed by closing the resonance space Da-r side with a closure plate 135.

As shown in FIG. 14C, when the opening 133 that communicably connects the resonance duct chambers (front Ea-f and rear Ea-f) divided in the Y direction into front and rear is closed with the closing plate 134, the resonance ducts Ea-f and Ea-r having the same lengths as those in the sixth embodiment are formed, because the front resonance duct Da-f and the rear resonance duct Da-r are divided into independent spaces.

In this manner, in the present embodiment, the lengths of the resonance ducts can be set differently corresponding to a desired frequency. Accordingly, it is possible to properly damp vibrations of different frequencies caused by combustion.

Consequently, vibrations caused by combustion are transmitted to the bypass pipe 61, and acoustic energy caused by the combustion vibrations is transmitted to the resonance spaces Da-f, Da-r, Db-f, and Db-r from the flow passage A through the communication passage C. The acoustic energy resonates in the resonance spaces Da-f, Da-r, Db-f, and Db-r, whereby the combustion vibrations are properly damped. At this time, the lengths of the Da-f, Da-r, Db-f, and Db-r are increased by twice by opening the opening 133, whereby the length of the pipe is increased. As a result, it is possible to properly perform low frequency tuning.

In the present embodiment, the chamber is divided into two, i.e., to the front chamber and the rear chamber in the axial direction. However, the present invention is not limited thereto, and the lengths of the resonance spaces can be further increased by dividing the chamber into more chambers.

INDUSTRIAL APPLICABILITY

The damping device and the gas turbine combustor according to the present invention effectively damp vibrations, simplify the structure, and reduce costs. The damping device and the gas turbine combustor can be applied to any type of damping devices and gas turbine combustors.

The invention claimed is:

1. A damping device that is mounted on an outer peripheral portion of a pipe including a flow passage through which fluid flows and that damps acoustic vibrations by introducing therein the fluid in the pipe, the damping device comprising:
    a fluid introducing unit in which a fluid introduction space that is able to introduce therein the fluid in the flow passage is formed by covering only a part of the outer peripheral portion of the pipe;
    a plurality of acoustic boxes that is connected to the fluid introducing unit via a branch pipe and includes;

a resonance space communicably connected with the fluid introduction space;

a base portion connected to the fluid introducing unit via the branch pipe; and an end portion that is spaced from the fluid introducing unit, extends along the outer peripheral portion of the pipe in a direction substantially perpendicular to the flow direction of the fluid in the pipe, and is connected to the base portion; and a plurality of partition plates that forms a resonance duct of a predetermined length by partitioning each of the resonance space, wherein the end portion of each of the plurality of acoustic boxes include first side surfaces facing each other with the pipe arranged therebetween and second side surfaces arranged farther apart from the pipe than the first side surfaces, the first side surfaces of the end portions are spaced from the fluid introducing unit, a resistance member that provides resistance to fluid is provided in the resonance space, the plurality of acoustic boxes between which the pipe is arranged are separated from the pipe, the first side surfaces and the second side surfaces of the plurality of acoustic boxes extend along the outer peripheral portion of the pipe in a direction substantially perpendicular to the flow direction of the fluid in the pipe, and third side surfaces connecting the first side surfaces and the second side surfaces.

2. The damping device according to claim 1, wherein each of the acoustic boxes has a peak portion and dip portion along the pipe at the connection between the base portion and the end portion.

3. The damping device according to claim 1, wherein in the end portion of each of the plurality of acoustic boxes, an end portion of each partition plate of the plurality of partition plates is alternatively fixed with one another to the first side surfaces and the second side surfaces.

4. The damping device according to claim 1, wherein the resonance space is communicably connected with the resonance duct formed at the end portion of the resonance space.

* * * * *